(12) United States Patent
Winer

(10) Patent No.: US 10,025,111 B2
(45) Date of Patent: Jul. 17, 2018

(54) BACKLIGHT MODULATION TO PROVIDE SYNCHRONIZATION BETWEEN SHUTTER GLASSES AND THREE DIMENSIONAL (3D) DISPLAY

(75) Inventor: Paul Winer, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 533 days.

(21) Appl. No.: 13/175,150

(22) Filed: Jul. 1, 2011

(65) Prior Publication Data

US 2013/0002835 A1    Jan. 3, 2013

(51) Int. Cl.
| | | |
|---|---|---|
| *H04N 13/04* | (2006.01) | |
| *H04N 9/47* | (2006.01) | |
| *G02B 27/22* | (2018.01) | |
| *G09G 3/34* | (2006.01) | |

(52) U.S. Cl.
CPC ..... *G02B 27/2264* (2013.01); *H04N 13/0438* (2013.01); *H04N 13/0497* (2013.01); *G09G 3/3406* (2013.01); *G09G 2380/00* (2013.01)

(58) Field of Classification Search
CPC .......... H04N 13/0438; H04N 13/0497; H04N 13/0454; H04N 13/0434; H04N 2213/008; H04N 13/0431; H04N 13/0418; H04N 13/0429; G09G 3/3406; G09G 2320/064; G09G 3/342; G09G 2320/0646; G09G 2310/0237
USPC ....................................... 348/56, 53
See application file for complete search history.

(56) References Cited

U.S. PATENT DOCUMENTS

| | | | |
|---|---|---|---|
| 2009/0027358 A1* | 1/2009 | hosono ................ | G06F 3/0421 345/175 |
| 2010/0026794 A1* | 2/2010 | Chang ............................ | 348/56 |
| 2010/0066820 A1* | 3/2010 | Park et al. ...................... | 348/53 |
| 2010/0149636 A1* | 6/2010 | MacNaughton ... | H04N 13/0438 359/477 |
| 2010/0253678 A1 | 10/2010 | Choi et al. | |
| 2010/0259603 A1 | 10/2010 | Mihara et al. | |
| 2010/0289883 A1 | 11/2010 | Goris et al. | |

(Continued)

FOREIGN PATENT DOCUMENTS

| | | |
|---|---|---|
| JP | 2010062767 A | 3/2010 |
| WO | 2013/006487 A2 | 1/2013 |
| WO | 2013/006487 A3 | 3/2013 |

OTHER PUBLICATIONS

International Search Report and Written Opinion received for PCT Patent Application No. PCT/US2012/045090, dated Dec. 28, 2012, 9 pages.

(Continued)

*Primary Examiner* — Farhan Mahmud
(74) *Attorney, Agent, or Firm* — Barnes & Thornburg LLP

(57) ABSTRACT

In general, in one aspect, a three dimensional (3D) display includes an optical stack, a backlight, panel electronics and a backlight driver. The optical stack is to present left eye and right eye images. The backlight is to illuminate the optical stack so the left eye and right eye images are visible and to provide signals for synchronizing the image illuminated on the optical stack with shutter glasses worn by a user to enable a left eye to view the left eye images and a right eye to view the right eye images. The panel electronics are to generate the left eye and right eye images on the optical stack. The backlight driver is to control operation of the backlight.

19 Claims, 5 Drawing Sheets

(56) References Cited

U.S. PATENT DOCUMENTS

| | | |
|---|---|---|
| 2010/0328439 A1 | 12/2010 | Mihara et al. |
| 2011/0001808 A1 | 1/2011 | Mentz et al. |
| 2011/0050849 A1 | 3/2011 | Lee et al. |
| 2011/0149053 A1* | 6/2011 | Ito et al. .......................... 348/56 |
| 2011/0316850 A1* | 12/2011 | Chen ............................. 345/419 |

OTHER PUBLICATIONS

International Preliminary Report on Patentability received for PCT Patent Application No. PCT/US2012/045090, dated Jan. 16, 2014, 6 pages.
Supplemental Search Report received for corresponding European Patent Application No. 12 807 237.8, dated Jan. 29, 2015, 8 pages.
Translation of Office Action and Search Report received for corresponding Chinese Patent Application No. 201280037836.8, dated May 20, 2016, 13 pages of Office Action and 3 pages of Search Report.
Translation of Office Action received for corresponding Chinese Patent Application No. 201280037836.8, dated Feb. 15, 2016, 5 pages.
European Office Action for Patent Application No. 12807237.8-1562, dated Jul. 24, 2017, 9 pages.

\* cited by examiner

BACKLIGHT MODULATION TO PROVIDE SYNCHRONIZATION BETWEEN SHUTTER GLASSES AND THREE DIMENSIONAL (3D) DISPLAY

BACKGROUND

Three dimensional (3D) video is becoming more popular for personal viewing via 3D consumer electronics (e.g., televisions, computer displays). Field sequential Stereoscopic 3D generates the perception of a 3D video by sequentially generating images for the left and then the right eye. In order for the viewer to see the video in 3D they should be presented the left eye image to the left eye and the right eye image to the right eye. In order to present the images to the associated eyes the viewer wears shutter glasses that open the shutter for the eye corresponding to the image presented and close the other eye. While an image (left, right) is being generated both shutters may be closed and the appropriate shutter (left, right) may be opened when the image is complete.

In order for the shutter glasses to know which eye to open when, there needs to be communication between the display and the shutter glasses to provide synchronization. The communication method is typically provided by an infrared transmitter that sends a signal to the shutter glasses indicating which shutter (left, right, neither) should be opened. The IR transmitter is typically not part of the display glass but is located in the housing. The use of the IR transmitter adds components and thus cost to the display, takes up physical space on the display, and requires integration with the circuitry generating the images.

BRIEF DESCRIPTION OF THE DRAWINGS

The features and advantages of the various embodiments will become apparent from the following detailed description in which.

DETAILED DESCRIPTION

Figure 1:
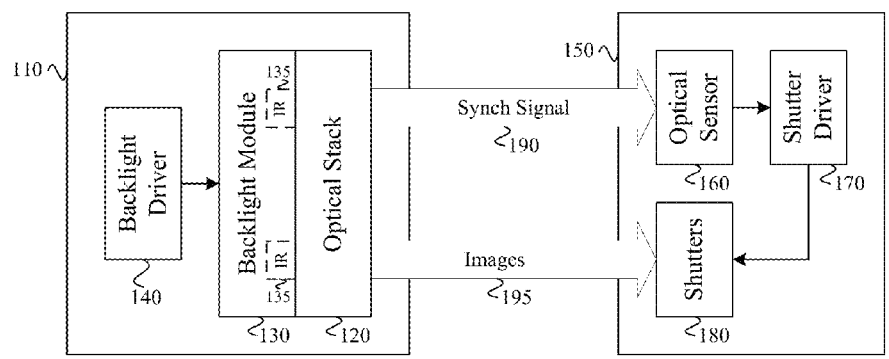
FIG. 1 illustrates an example system for providing synchronization between a display and shutter glasses, according to one embodiment.

FIG. 1 illustrates an example system 100 for providing synchronization between a display 110 and shutter glasses 150. The display 110 may be a liquid crystal display (LCD). The display 110 includes an optical stack 120, panel electronics (not illustrated), a backlight module 130, and a backlight driver 140. The panel electronics receive instructions from a graphics processor or a central processor (neither illustrated) regarding the images (left eye, right eye) to be presented and controls the writing of the images on the optical stack 120 and may control the timing associated therewith. The backlight module 130 illuminates the optical stack 120 so that the images written thereon can be seen by the user. The backlight driver 140 controls the operation of the backlight module 130.

The shutter glasses 150 include an optical sensor 160, a shutter driver 170 and shutters 180. The optical sensor 160 is to receive synchronization signals 190 from the display 110 and provide them to the shutter driver 170. The optical sensor 160 may be a silicon photo diode and may be capable of detecting light in the visible to infrared (IR) spectrum, light having a wavelength between approximately 500 nanometers (nm) and 1000 nm. The shutter driver 170 controls the operation of the shutters 180 so an appropriate lens (not illustrated) is open when the associated image 195 is presented on the display 110 (the glasses 150 are synchronized with the display 110). The shutters 180 include a right shutter over a right lens and a left shutter over a left lens (separate left and right shutters not illustrated).

The panel electronics generates an image (left eye, right eye) on the optical stack 120 pixel by pixel. The timing associated with the generation of the image occurs at a rate that is fast enough that the human eye does not detect the pixel by pixel changes (if the backlight 130 was illuminated). After the generation of an image is complete there is a delay (e.g., the vertical blanking interval (VBI)) before the generation of a next image (right eye, left eye) begins. It is during this delay that the human eye views the image presented when the backlight 130 is illuminated. The current image is overwritten by the next image pixel by pixel so that the optical stack 120 has some pixels associated with the current image and some associated with the next image.

The backlight driver 140 may pulse the backlight 130 on and off at a fast rate, pulse width modulation (PWM). The pulsing on/off of the backlight 130 may conserve power and processing resources and can not be detected by the human eye. Rather, the amount of time that the backlight 130 is on controls the brightness of the display 110. To further conserve power and processing resources, the pulsing of the backlight 130 in some displays 110 may be limited to when generation of the image is complete (during the VBI). The backlight 130 may be off when the image is being generated. The backlight driver 140 may detect when a VBI begins and ends or may be notified (e.g., by the panel electronics). Limiting the backlight PWM to the VBI may also help ensure that the correct images (left eye, right eye) are only presented to the correct eye (left, right) since the optical stack 120 is not illuminated when an image is being generated and the optical stack 120 has some pixels associated with the current image and some associated with the next image. Accordingly, during image generation it wouldn't matter which shutter 180 was open.

Figure 2:
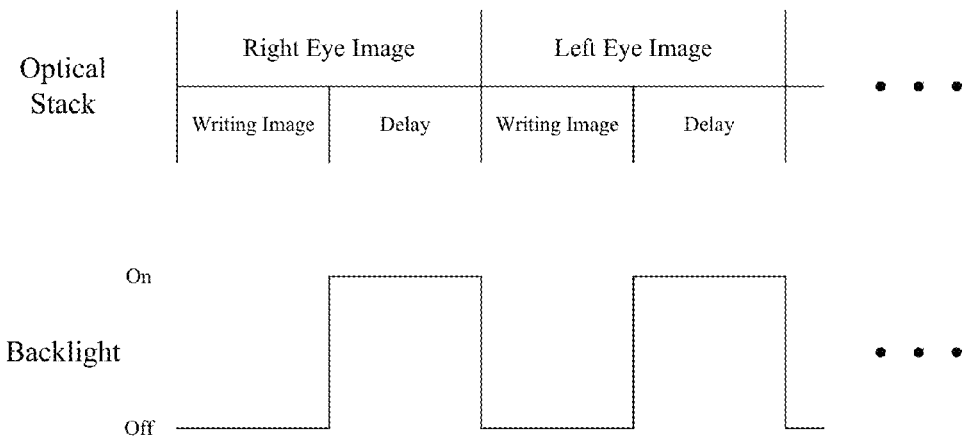
FIG. 2 illustrates an example timing diagram of the writing of the images on the optical stack and the use of the backlight to make the images visible, according to one embodiment.

FIG. 2 illustrates an example timing diagram of the writing of the images on the optical stack 120 and the use of the backlight 130 to make the images visible. The optical stack 120 alternates between right eye images and left eye images. Initially a right eye image is written to the optical stack 120 (e.g., pixel by pixel). After the right eye image is complete there is a waiting period (e.g., VBI) before a left eye image begins to be written over the right eye image. The backlight 130 may be off during the period in which the image is being written and on during the waiting period. When the backlight 130 is on it may actually be pulsing (backlight PWM). The pulsing of the backlight is not illustrated.

As the operation of the backlight 130 is coordinated with a VBI (completion of an image), it could be utilized to synchronize the shutter glasses 150 with the image presented on the display 110. The panel electronics and the backlight driver 140 may communicate in some fashion so that the backlight driver 140 knows when a VBI occurs and knows what image (left eye, right eye) is on the optical stack 120 for the VBI. When the backlight 130 is initially turned on it may transmit a particular code associated with the image being presented. The optical sensor 160 may be capable of detecting the code and synchronizing the shutters 180 accordingly.

Figure 3:
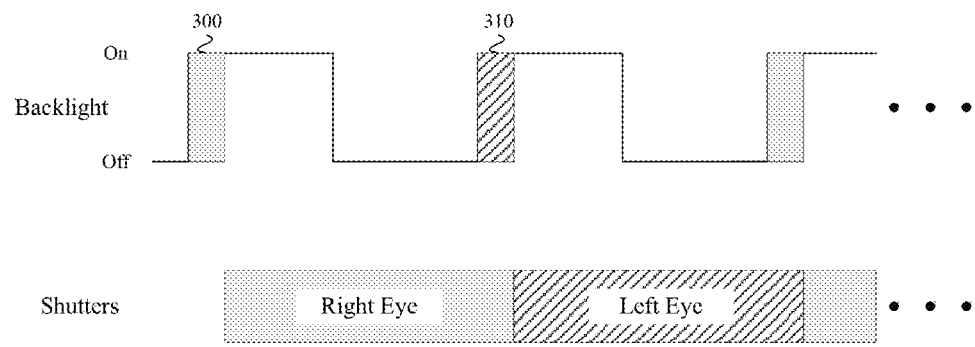
FIG. 3 illustrates an example timing diagram of the operation of the backlight and the corresponding operation of the shutters, according to one embodiment.

FIG. 3 illustrates an example timing diagram of the operation of the backlight 130 and the corresponding operation of the shutters 180. It should be noted that even though the writing of the images on the optical stack 120 are not illustrated, they are coordinated with the operation of the backlight 130 (as illustrated in FIG. 2). When a right eye image is complete (and the VBI begins), the backlight 130 becomes active and may initially transmit a right eye code 300 before it begins the backlight PWM to illuminate the image. The optical sensor 160 may detect the right eye code 300 and instruct the shutter driver 170 accordingly. The shutter driver 170 may cause the right eye shutter to open (and the left eye shutter to close). When a left eye image is complete, the backlight 130 may initially transmit a left eye code 310 before it begins the backlight PWM. The optical sensor 160 may detect the left eye code and the shutter driver 170 may accordingly open the left eye shutter (and close the right eye shutter). The right eye shutter may remain open from the time the right eye code was detected until the left eye code is detected. Leaving the right eye shutter open when the left eye image is being written is not an issue if the backlight is not on at this point.

The backlight 130 may utilize a modulation scheme to create the codes associated with the left eye and right eye images. The modulation scheme may be similar to a modulation scheme used with infrared (IR) remote controls where the light is modulated at a certain frequency (e.g., 38 kHz).

Figure 4:
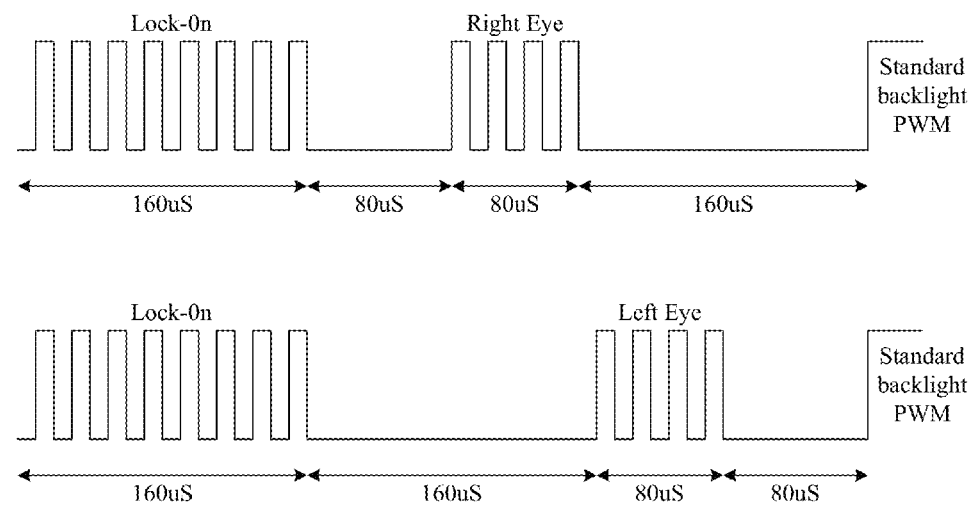
FIG. 4 illustrates an example modulation scheme that may be utilized for coding the left and right images, according to one embodiment.

FIG. 4 illustrates an example modulation scheme of the backlight 130 that may be utilized for coding the left eye and right eye images. Initially, when the delay period begins the backlight 130 may be pulsed on and off rapidly for a period of time. As illustrated, the backlight 130 is pulsed on and off at 10 microsecond (μsec) intervals eight times (160 μsec total). The optical sensor 160 may detect the modulation and lock on to the backlight 130 looking for a code associated with which image is forthcoming. The codes for the left eye and right eye image may be the same with the timing associated with when the code is received indicating whether it is a left eye or right eye image. As illustrated, the codes for the left eye and right eye image are the pulsing on and off of the backlight 130 at 10 μsec intervals four times (80 μsec total). If the optical sensor 160 receives the code after an 80 μsec delay (second half of next 160 μsec period) a determination may be made that the upcoming image is a right eye image. If the optical sensor 160 receives the code after a 160 μsec delay (first half of second 160 μsec period) a determination may be made that the upcoming image is a left eye image.

As illustrated, an overall right eye synchronization sequence includes 160 μsec of the backlight 130 being pulsed to enable the optical sensor 160 to lock, followed by 80 μsec of the backlight 130 being off, followed by 80 μsec of the backlight 130 being pulsed, followed by 160 μsec of the backlight 130 being off. At this point the optical sensor 160 should have determined that a right eye image is about to be displayed and the shutter driver 170 should open the right shutter and close the left shutter. The backlight 130 should then be pulsed at the normal rate during the VBI (e.g., between 2 and 5 milliseconds msec)).

As illustrated, an overall left eye synchronization sequence includes 160 μsec of the backlight 130 being pulsed to enable the optical sensor 160 to lock, followed by 160 μsec of the backlight 130 being off, followed by 80 μsec of the backlight 130 being pulsed, followed by 80 μsec of the backlight 130 being off. At this point the optical sensor 160 should have determined that a left eye image is about to be displayed and the shutter driver 170 should open the left shutter and close the right shutter. The backlight 130 should then be pulsed at the normal rate during the VBI.

It should be noted that the modulation scheme is not limited to the illustrated examples of FIG. 4. Rather, any type of modulation scheme cart be used without departing from the scope. For example, the timing of the left eye and right eye code after the lock-on signal may be the same but the modulation pattern may be different.

Figure 5:
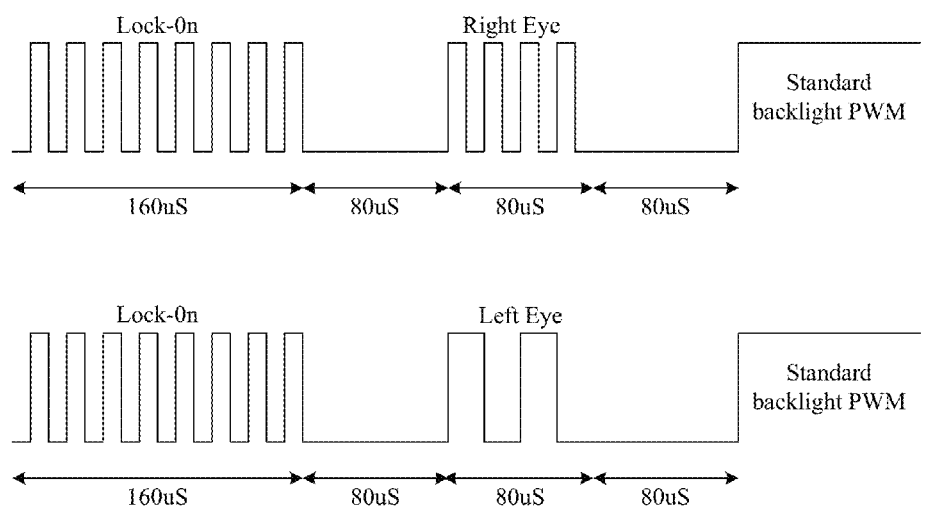
FIG. 5 illustrates an example modulation scheme that may be utilized for coding the left and right images, according to one embodiment.

FIG. 5 illustrates an example modulation scheme of the backlight 130 that may be utilized for coding the left eye and right eye images. The initial lock-on period is the same as illustrated in FIG. 4. After the lock on period there is an 80 μsec off period followed by an 80 μsec period where the appropriate eye code is presented. The right eye code is the same as illustrated in FIG. 4 (pulsing on and off of the backlight 130 at 10 μsec intervals four times). The left eye code consists of the pulsing on and off of the backlight 130 at 20 μsec intervals two times. The optical sensor 160 may determine which image is being presented based on the pattern received. The appropriate code (left eye, right eye) is followed by an 80 μsec off period prior to the standard backlight PWM beginning.

According to one embodiment, the timing associated with the VBI may be increased to account for the synchronization of the display and the shutter glasses occurring in this time frame.

Referring back to FIG. 1, the backlight module 130 may include one or more infrared (IR) emitters 135. The IR emitters 135 may improve the synchronization between the display 110 and the shutter glasses 150 as the optical sensor 160 may more accurately detect the IR signals. The IR emitters 135 may be operated in the same fashion as the rest of the backlight 130 (illuminated at the same time). Alternatively, the IR emitters 135 may only be illuminated to provide the synchronization signals for right and left eye images. During synchronization, the entire backlight 130 may be modulated to provide the synchronization signals or only the IR emitters 135 may be modulated to provide the synchronization signals (the rest of the backlight 130 may be off). The backlight driver 140 may control which portions of the backlight 130 are modulated for illumination and synchronization.

Figure 6:
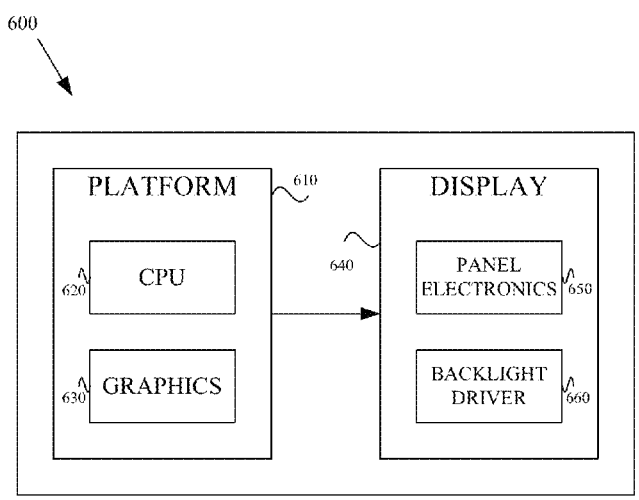
FIG. 6 illustrates a high level functional diagram of an example 3D device, according to one embodiment.

FIG. 6 illustrates a high level functional diagram of an example 3D device 600. The device 600 may include a processing platform 610 and a display 641). The processing platform 611) may include a main processor (CPU) 620 and a graphics processor (GPU) 630. The display 640 may include panel electronics 650, an optical stack (not illustrated), a backlight driver 660, and a backlight (not illustrated). The platform 610 (CPU 620 and/or GPU 630) may receive and process data related to a 3D video in order to create the left eye and right eye images to be presented on the display 640 (optical stack). The panel electronics 650 may generate the images on the optical stack based on input from the platform 610. The backlight driver 660 may control operation of the backlight to illuminate the optical stack so that the user can see the images generated thereon and may also control the synchronization.

The panel electronics 650 and the backlight driver 660 may communicate to coordinate timing therebetween so that the backlight driver 660 generates the synchronization signal at the beginning of the VBI, modulates the backlight during the VBI, and turns the backlight off at the end of the VBI so that the backlight is inactive during image generation. Alternatively, the display may include a timing controller (not illustrated) that controls the timing of the functions performed by the panel electronics 650 and the backlight driver 660. According to one embodiment, the platform 610 (CPU 620 and/or GPU 630) may control the timing of the functions performed by the panel electronics 650 and the backlight driver 660. The platform 610 may monitor the operations of the panel electronics 650 and the backlight driver 660 and make any adjustments thereto or to its own operations based on the monitoring.

The parameters associated with panel electronics 650 and the backlight driver 660 (e.g., VBI time, backlight PWM, synchronization signals) may be programmable. The parameters may be programmed in the display 640 or may be programmed in the platform 610 and the platform 610 may update the display 640 accordingly.

The shutter glasses 150 may be associated with the 3D device 600 in order to operate therewith (e.g., know what type be synchronization signals to look for). The parameters associated with the shutter glasses 150 may be programmable in order to operate with various 3D devices 600 or to modify parameters associated therewith to match parameter modifications made to an associated 3D device 600. The parameters of the shutter glasses 150 may be programmed in the shutter glasses 150 or in the 3D device 600 and transferred to the shutter glasses 150.

Figure 7:
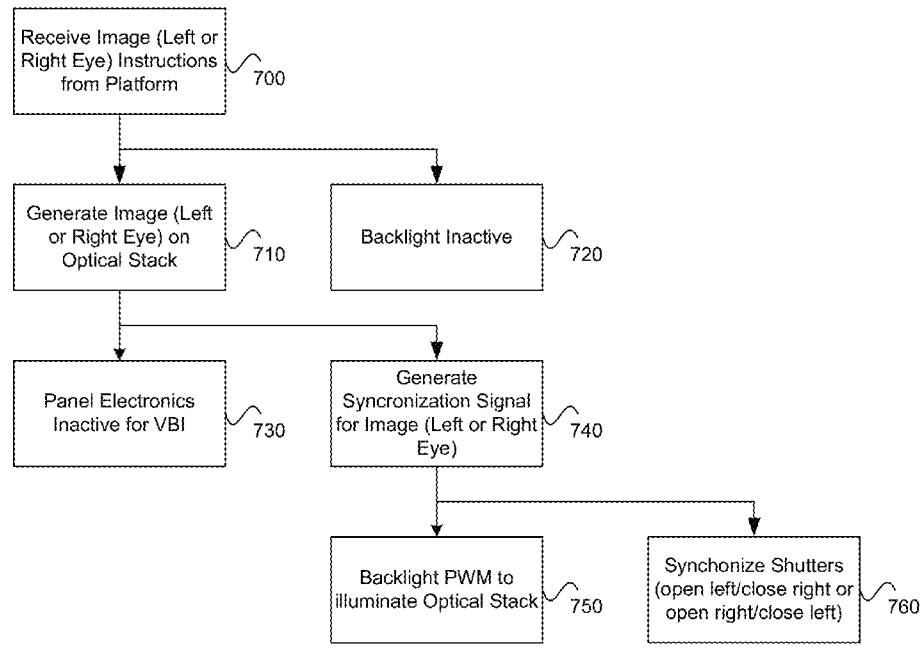
FIG. 7 illustrates an example flow chart of actions taken to synchronize the display and the shutter glasses using the backlight, according to one embodiment.

FIG. 7 illustrates an example flow chart of actions taken to synchronize the display and the shutter glasses using the backlight. Initially the panel electronics receives instructions from the platform regarding the image (left eye, right eye) to be presented on the display 700. The panel electronics then generate the image on the optical stack 710 and during this time the backlight may be inactive 720. After the image has been presented on the optical stack the panel electronics may be inactive during the VBI 730. Upon initiation of the VBI, the backlight driver may generate the synchronization signal for the image (left eye, right eye) 740. The optical sensor may detect the synchronization signal and open/close the appropriate shutter on the shutter glasses so that the appropriate eye can see the appropriate image (e.g., close left shutter and open right shutter for right eye image) 760. The backlight may be modulated at a desired PWM to illuminate the optical stack 750. Once the VBI is over the process will return to 700.

The synchronization between the display and the shutter glasses has only been discussed with respect to switching between the left eye shutter and the right eye shutter (one shutter always open). The operation of the shutter glasses is not limited thereto. For example, both shutters could be closed during at least a portion of image refresh periods. The shutter glasses may close an open shutter a predefined amount of time (e.g., approximately equal to VBI period, slightly longer than VBI period to ensure image was visible entire VBI period) after the shutter was opened based on receipt of the synchronization signal to open the shutter. Alternatively, a synchronization signal may be received to close the shutter. The close shutter synchronization signal may be transmitted at the end of the VBI period or a certain period of time after the VBI period (beginning of image refresh period when backlight is typically inactive).

Figure 8A:
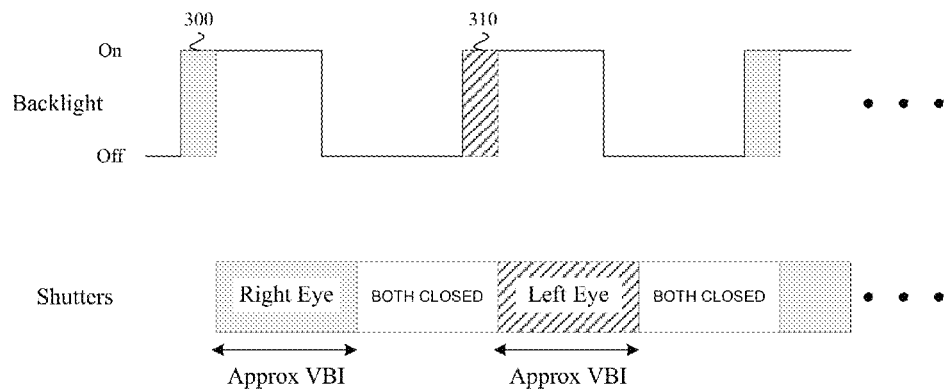
FIGS. 8A-B illustrate example timing diagram showing both shutters of the shutter glasses closed for a period of time, according to different embodiments.
Figure 8B:
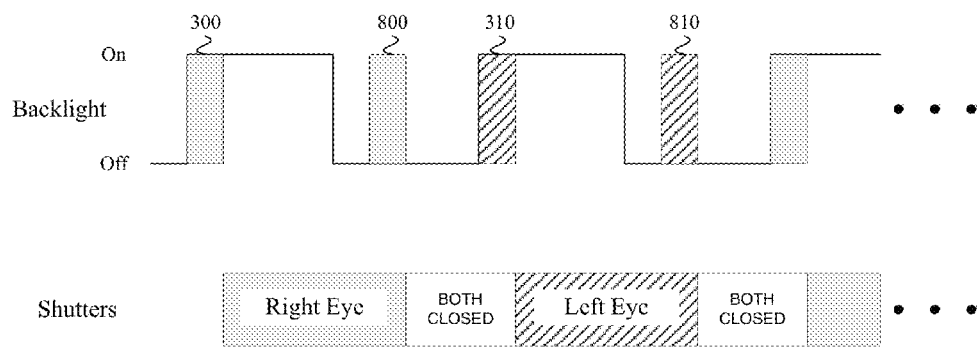

FIGS. 8A-B illustrate example timing diagram showing both shutters of the shutter glasses closed for a period of time (a portion of the image refresh period which is not illustrated but is understood to be substantially aligned with the backlight being off). FIG. 8A illustrates the closing of an open shutter being controlled by the shutter glasses. As illustrated, the backlight transmits a right eye synchronization signal 300 and upon detecting the synchronization signal the shutter glasses open the right shutter. The right shutter stays open for a period of time approximately equal to the VBI period and then the shutter glasses close the right eye shutter so that both shutters are closed. The tracking of the timing is done by the shutter glasses. The backlight then transmits a left eye synchronization signal 310 and the shutter glasses open the left shutter. The left shutter stays open for approximately the VBI period and then the shutter glasses close the left eye shutter so that both shutters are closed.

FIG. 8B illustrates the use of backlight synchronization signals to control the closing of an open shutter. As illustrated the backlight transmits a right eye complete synchronization sequence 800 a certain period of time after a backlight active period associated with the right eye VBI is complete (beginning of left eye image refresh period when backlight is typically inactive) and upon detecting the synchronization signal the shutter glasses close the right eye shutter so both shutters are closed. Both shutters stay closed until the left eye synchronization signal 310 is transmitted and the left eye shutter is opened. After completion of the left eye VBI, the backlight transmits a left eye complete synchronization sequence 810 and the shutter glasses close the left upon detecting the synchronization signal the. It should be noted that since the right eye complete and left eye complete synchronization sequences 800, 810 are simply closing both shutters that the synchronization sequences don't have to distinguish between left eye and right eye. Rather the synchronization sequences can be the same (VBI complete signals).

The use of the backlight to provide a synchronization signal has been discussed with respect to displays where the backlight if off while an image (left eye, right eye) is generated on the optical stack. The use of the backlight to provide synchronization with the shutter glasses is not limited thereto. For example, the backlight modulation scheme utilized to provide synchronization with the shutter glasses can be implemented in a display where the backlight is modulating during the image generation on the optical stack.

Figure 9:
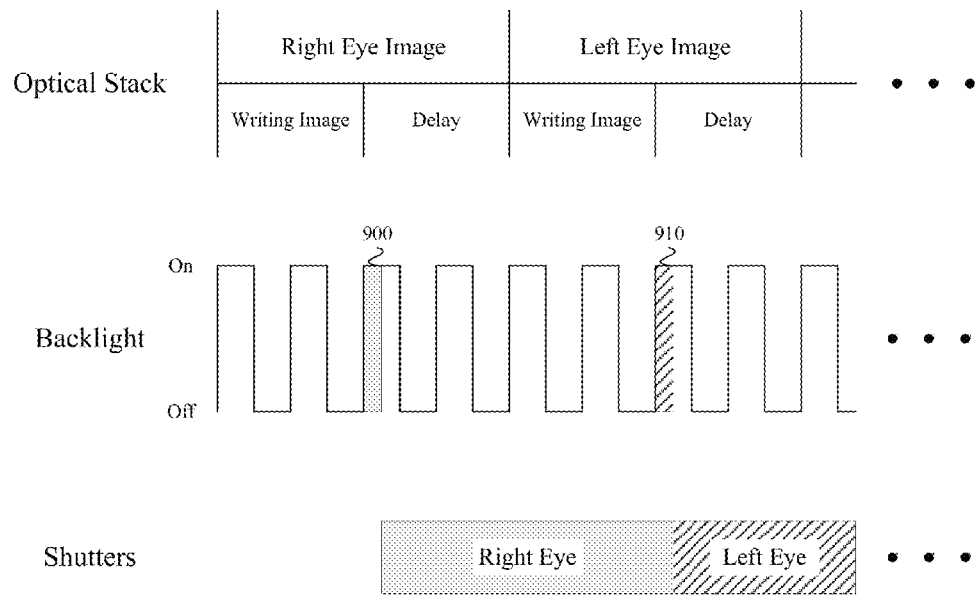
FIG. 9 illustrates example timing diagrams of the writing of images on the optical stack, the operation of the backlight, and the corresponding operation of the shutters, according to one embodiment.

FIG. 9 illustrates example timing diagrams of the writing of images on the optical stack 120, the operation of the backlight 130, and the corresponding operation of the shutters 180. The top timing diagram is of the operation of the panel electronics writing the images followed by a delay (VBI). The second diagram illustrates the normal modulation of the backlight to illuminate the optical stack. Once the VBI is started for the right eye image, the backlight driver modifies the modulation of the backlight to generate a right eye synchronization sequence 900. After completion of the right eye synchronization sequence, the backlight driver returns the backlight to the PWM for illumination. Likewise, once the VBI is started for the left eye image, the backlight driver modifies the modulation of the backlight to generate a left eye synchronization sequence 910 and then returns to the backlight PWM for illumination. The third diagram illustrates that once the optical sensor detects the right eye synchronization sequence it opens the right eye shutter (and closes the left eye shutter) and maintains this arrangement until the optical sensor detects the left eye synchronization sequence and opens the left eye shutter (and closes the right eye shutter).

FIG. 9 illustrates the shutter for the right eye opened while the optical stack is writing over the right eye image with a left eye image and the backlight is modulating and possibly illuminating an image that is a combination of the right eye image and the left eye image and vice versa. In order to prevent such an occurrence that could possibly affect the visual quality of the 3D video being presented both shutters may be closed during the image refresh periods. The closing of the both shutters may be initiated, for example, as disclosed above with respect to FIGS. 8A-B. White the shutters could be closed and the backlight could be active during image refresh periods, such a configuration would not be practical from a power conservation point of view. Rather, during periods when both shutters are closed it is likely that the backlight would be inactive to both conserve power and improve image quality performance.

The various embodiments described above may incorporated in various electronic devices that display 3D video, may be capable of displaying 3D video, or may in the future be capable of displaying 3D video, including, for example, a television, digital video disk (DVD) player, digital video recorder (DVR), personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart television), mobile internet device (MID), messaging device, data communication device, and so forth.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method comprising
generating a right eye image on an optical stack of a display for a three dimensional (3D) display device;
idling the optical stack for a period of time after the right eye image is generated;
upon completion of the generation of the right eye image on the optical stack and beginning of the idling of the optical stack, modulating a backlight of the 3D display device on and off for a defined period of time to create a plurality of light pulses organized in a first pattern that is detectable by an optical sensor in shutter glasses and causes the shutter glasses to initiate a timer usable to determine whether a subsequent pattern from the backlight is indicative of a subsequent pattern to close a left eye shutter or a right eye shutter and to lock on to the backlight in anticipation of receiving signals indicating which eye image is to be illuminated;
after completion of the first pattern of light pulses user to have the optical sensor lock on the backlight, modulating the backlight on and off to create a plurality of light pulses organized in a second pattern, wherein the second pattern is to act as a right eye code, wherein the right eye code is to be detected by the optical sensor in the shutter glasses that is locked on to the backlight and cause the shutter glasses to close the left eye shutter and open the right eye shutter;
pulse width modulating the backlight to illuminate the optical stack to display the right eye image during the idle period;
generating a left eye image on the optical stack;
idling the optical stack for the period of time after the left eye image is generated;
upon completion of the generation of the left eye image on the optical stack and beginning of the idling of the optical stack, modulating the backlight on and off for the defined period of time to create the plurality of light pulses organized in the first pattern that can be detected by the optical sensor in the shutter glasses so that the optical sensor locks on to the backlight in anticipation of receiving signals indicating which eye image is to be illuminated;
after completion of the first pattern of light pulses used to have the optical sensor lock on the backlight, modulating the backlight on and off to create a plurality of light pulses organized in a third pattern, wherein the third pattern is to act as a left eye code, wherein the left eye code is to be detected by the optical sensor in the shutter glasses that is locked on to the backlight and cause the shutter glasses to close the right eye shutter and open the left eye shutter; and
pulse width modulating the backlight to illuminate the optical stack to display the left eye image during the idle period.

2. The method of claim 1, further comprising receiving instructions for generating the right eye image and left eye image from a processing platform.

3. The method of claim 1, further comprising turning the backlight off while the right eye image and the left eye image are generated.

4. The method of claim 1, wherein the backlight includes one or more infrared (IR) emitters interspersed within the backlight, and wherein
modulating the backlight on and off to create the first pattern of light pulses to enable the optical sensor to lock on to the backlight includes modulating the one or more IR emitters in the backlight on and off;
modulating the backlight on and off to create the second pattern of light pulses to act as the right eye code includes modulating the one or more IR emitters in the backlight on and off; and
modulating the backlight on and off to create the third pattern of light pulses to act as the left eye code includes modulating the one or more IR emitters in the backlight on and off.

5. The method of claim 1, further comprising
at conclusion of idle period following the generation of the right eye image, modulating the backlight on and off to create a plurality of light pulses, wherein the plurality of light pulses are organized in a fourth pattern, wherein the fourth pattern is to act as an end of idle period code, wherein the end of idle period code is detected by the optical sensor and causes the shutter glasses to close both the right eye shutter and the left eye shutter; and at conclusion of idle period following the generation of the left eye image, modulating the backlight on and off to create the fourth pattern of light pulses to act as the end of idle period code, wherein the end of idle period code is detected by the optical sensor and causes the shutter glasses to close both the right eye shutter and the left eye shutter.

6. The method of claim 1, further comprising tracking time after opening the right shutter based on the optical sensor detecting the right eye code;

closing the right shutter after a predetermined amount of time so that both shutters are closed until the optical sensor detects the left eye code and the left shutter is opened;

tracking time after opening the left shutter based on the optical sensor detecting the left eye code; and closing the left shutter after the predetermined amount of time so that both shutters are closed until the optical sensor detects the right eye code and the right shutter is opened.

7. A three dimensional (3D) viewing system comprising a processor to receive and process data related to a 3D video in order to create the left eye and right eye images to be presented;

an optical stack to present the left eye images and right eye images;

shutter glasses worn by a user to enable a left eye to view the left eye images and a right eye to view the right eye images, wherein the shutter glasses include a left eye shutter, a right eye shutter and an optical sensor to detect synchronization signals, and wherein the shutter glasses close the left eye shutter and open the right eye shutter when the optical sensor detects a right eye synchronization signal and close the right eye shutter and open the left eye shutter when the optical sensor detects a left eye synchronization signal;

a backlight having one or more infrared (IR) emitters interspersed within the backlight, wherein the backlight is to illuminate the optical stack so the left eye images and right eye images are visible, modulate on and off to generate a plurality of light pulses organized in a first pattern that is detectable by the optical sensor and causes the shutter glasses to initiate a timer usable to determine whether a subsequent pattern from the backlight is indicative of a subsequent pattern to close a left eye shutter or a right eye shutter;

modulate on and off to generate a plurality of light pulses organized in a second pattern to act as the right eye synchronization signal, and modulate on and off to generate a plurality of light pulses organized in a third pattern to act as the left eye synchronization signal, wherein the right eye synchronization signal and the left eye synchronization signal are for synchronizing the shutter glasses to a corresponding image illuminated on the optical stack;

panel electronics to generate the left eye images and right eye images on the optical stack based on input from the processor; and a backlight driver to control operation of the backlight.

8. The 3D viewing system of claim 7, wherein the panel electronics are idle for a period of time after the generation of the right eye image on the optical stack is complete and after the left eye image on the optical stack is complete;

the backlight driver causes the backlight to modulate on and off to generate the second pattern of light pulses to act as the right eye synchronization signal at a start of an idle period after the generation of the right eye image, and modulate on and off to generate the third pattern of light pulses to act as the left eye synchronization signal at a start of an idle period after the generation of the left eye image.

9. The 3D viewing system of claim 8, wherein the backlight driver causes the backlight to illuminate the optical stack during the idle periods after the generation of the right eye synchronization signal and the left eye synchronization signal.

10. The 3D viewing system of claim 7, wherein the backlight driver causes the backlight to be off while the panel electronics generate the right eye images and the left eye images on the optical stack.

11. The 3D viewing system of claim 8, wherein the backlight driver causes the backlight to modulate on and off to:

generate the second pattern of light pulses to act as the right eye synchronization signal, and generate the third pattern of light pulses to act as the left eye synchronization signal.

12. The 3D viewing system of claim 8, wherein the shutter glasses track time after opening an appropriate shutter based on the optical sensor detecting a synchronization signal and close the appropriate shutter after a predetermined amount of time so that both shutters are closed until the optical sensor detects a next synchronization signal and a next shutter is opened.

13. The 3D viewing system of claim 7, wherein the panel electronics are idle for a period of time after generation of a right eye image on the optical stack is complete and after generation of a left eye image on the optical stack is complete; and the backlight driver further causes the backlight to modulate on and off to generate a plurality of light pulses organized in a fourth pattern to act as an end of idle period code when the idle period after the right eye image or the idle period after the left eye image is completed, wherein the end of idle period code is detected by the optical sensor and causes the shutter glasses to close both the right eye shutter and the left eye shutter.

14. The 3D viewing system of claim 7, wherein the backlight driver further causes the backlight to modulate on and off to generate light pulses organized in a fourth pattern to act as a lock on code prior to the backlight modulating on and off to generate the second pattern of light pulses to act as the right eye synchronization signal, wherein the lock on code is detected by the optical sensor and enables the optical sensor to lock on to the backlight in anticipation of receiving a synchronization signal indicating which eye image is to be illuminated; and modulate on and off to generate light pulses organized in the fourth pattern to act as the lock on code prior to the backlight modulating on and off to generate the third pattern of light pulses to act as the left eye synchronization signal.

15. A three dimensional (3D) display comprising
an optical stack to present left eye images and right eye images;
a backlight having one or more infrared (IR) emitters interspersed within the backlight, wherein the backlight is to
illuminate the optical stack so the left eye images and right eye images are visible,
modulate on and off to generate a plurality of light pulses organized in a first pattern that is detectable by an optical sensor in shutter glasses and causes the shutter glasses to initiate a timer usable to determine whether a subsequent pattern from the backlight is indicative of a subsequent pattern to close a left eye shutter or a right eye shutter;
modulate on and off to generate a plurality of light pulses organized in a second pattern to act as the right eye synchronization signal, and
modulate on and off to generate a plurality of light pulses organized in a third pattern to act as the left eye synchronization signal, wherein the right eye synchronization signal and the left eye synchronization signal are for synchronizing the image illuminated on the optical stack with shutter glasses worn by a user to enable a left eye to view the left eye images and a right eye to view the right eye images, wherein the shutter glasses close a right eye shutter and open a left eye shutter when the left eye synchronization signal is detected and close the left eye shutter and open the right eye shutter when the right eye synchronization signal is detected;
panel electronics to generate the left eye images and right eye images on the optical stack; and
a backlight driver to control operation of the backlight.

16. The 3D display of claim 15, wherein
the panel electronics are idle for a period of time after generation of a right eye image on the optical stack is complete and after of a left eye image on the optical stack is complete;
the backlight driver causes the backlight to modulate on and off to generate the second pattern of light pulses to act as the right eye synchronization signal at a start of an idle period after the generation of the right eye image, and modulate on and off to generate the third pattern of light pulses to act as the left eye synchronization signal at a start of an idle period after the generation of the left eye image; and
the backlight driver causes the backlight to illuminate the optical stack during the idle periods after the backlight is modulated to generate the second pattern of light pulses to act as the right eye synchronization signal and the third pattern of light pulses that act as the left eye synchronization signal.

17. The 3D display of claim 16, wherein the backlight driver causes the backlight to modulate on and off to:
generate the second pattern of light pulses to act as the right eye synchronization signal, and
generate the third pattern of light pulses to act as the left eye synchronization signal.

18. The 3D display of claim 15, wherein
the panel electronics are idle for a period of time after generation of a right eye image on the optical stack is complete and after generation of a left eye image on the optical stack is complete; and
the backlight driver further causes the backlight to modulate on and off to generate a plurality of light pulses organized in a fourth pattern to act as an end of idle period code when the idle period after the right eye image or the idle period after the left eye image is completed, wherein the end of idle period code is detected by the optical sensor and causes the shutter glasses to close both the right eye shutter and the left eye shutter.

19. The 3D display of claim 15, wherein the backlight driver further causes the backlight to
modulate on and off to generate light pulses organized in a fourth pattern to act as a lock on code prior to the backlight modulating on and off to generate the second pattern of light pulses to act as the right eye synchronization signal, wherein the lock on code is detected by the optical sensor and enables the optical sensor to lock on to the backlight in anticipation of receiving a synchronization signal indicating which eye image is to be illuminated; and
modulate on and off to generate light pulses organized in the fourth pattern to act as the lock on code prior to the backlight modulating on and off to generate the third pattern of light pulses to act as the left eye synchronization signal.

* * * * *